May 30, 1950     A. E. RUDAHL     2,510,039
ELECTRIC BLANKET CONTROL
Filed Jan. 17, 1947
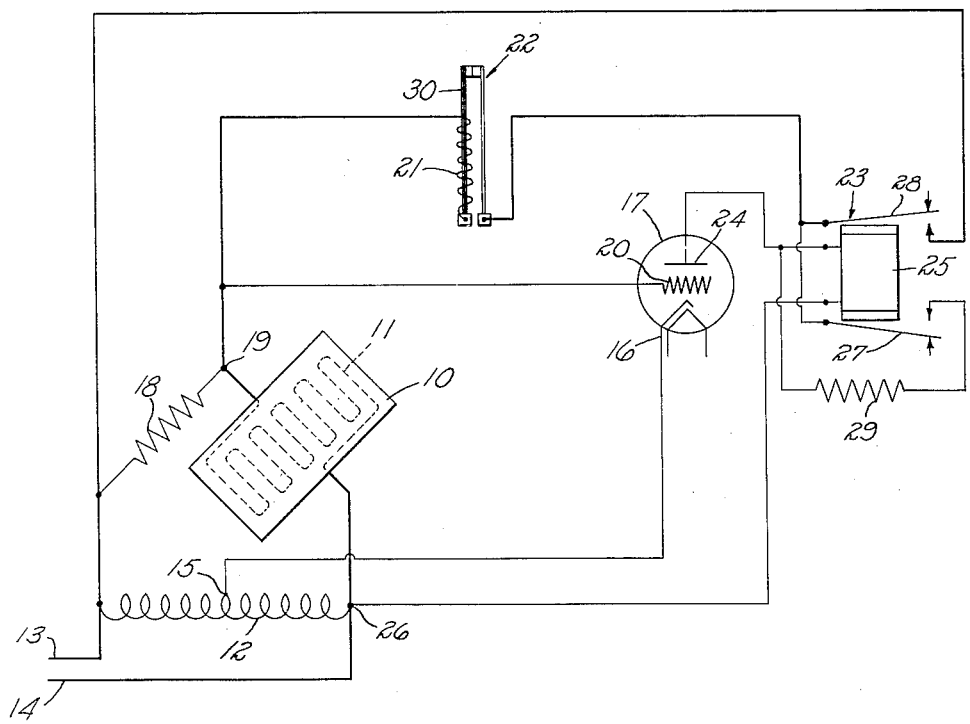
Inventor
ARNOLD E. RUDAHL
By *N. Clay Lindsey*
Attorney Patented May 30, 1950

2,510,039

UNITED STATES PATENT OFFICE 2,510,039

ELECTRIC BLANKET CONTROL

Arnold E. Rudahl, Middlefield, Conn., assignor to Landers, Frary & Clark, New Britain, Conn., a corporation of Connecticut Application January 17, 1947, Serial No. 722,575

5 Claims. (Cl. 219—46)

The present invention relates to electric blankets, and more particularly to a control circuit therefor which is effective for regulating the amount of heat generated within the blanket and for preventing wide fluctuations in temperature or heat loss therethrough so as to insure the complete comfort of the user.

It is an object of the invention to provide a control circuit for electric blankets which is responsive to temperatures within the blanket itself so as to control the amount of heating by the thermal conditions of the blanket itself.

A further object of the invention is to provide such a control circuit which utilizes the heating element of the blanket as an element in the control circuit thereby rendering the control circuit responsive to temperature conditions within the blanket itself while eliminating the need for supplementary or additional elements within the blanket for accomplishing this purpose.

Another object of the invention is to provide a control circuit of the character described which is safe and reliable under all conditions of operation and effective for accomplishing the purposes intended without likelihood of malfunctioning or requiring frequent replacement or repair.

Other objects will be in part obvious and in part pointed out more in detail hereinafter.

The invention accordingly consists in the features of construction, combination of elements and arrangements of parts which will be exemplified in the construction hereafter set forth and the scope of the application of which will be indicated in the appended claims.

In the drawing, the single figure is a wiring diagram of a specific embodiment of a control circuit for electric blankets arranged in accordance with the invention.

Referring to the drawing, the reference numeral 10 denotes an electric blanket formed of conventional blanketing material and having disposed therein a heater element 11 which may be in the form of a thin resistance wire suitably insulated and disposed in a plurality of convolutions throughout the blanket so as to provide uniform heating thereof. This construction is well known in the art and need not be more fully described here.

In accordance with the invention, the heater element 11 is formed of a material whose resistance varies with its temperature. Preferably, as in the embodiment shown in the drawing, the temperature coefficient of resistance of this material is strongly positive, i. e., its resistance appreciably increases in relationship to increases in its temperature. A wide variety of metals and alloys are available for fulfilling these conditions as is well known in the art.

The inductance coil 12, which may be the primary of a transformer or auto-transformer, for example, is connected across the power lines 13 and 14 which, for convenience, may be the usual household lighting circuit. The inductance coil 12 is tapped at an intermediate point 15 for connection to the cathode 16 of an amplifier which, for convenience, is shown as a triode 17. If desired, other types of electronic tubes, such as amplifier or relay tubes, or a plurality of tubes, might be utilized as will be readily apparent to one skilled in the art.

The resistance 18 is a fixed or reference resistance having a zero or negligible temperature coefficient of resistance and is connected with the two sections of the inductance coil 12 and the heater element 11 so as to form a bridge circuit. The apex 19 of the bridge circuit is connected to the grid 20 of the tube 17. It also is connected through the heater wire 21 and a thermal relay 22 to both arms 27 and 28 of the double pole single throw relay 23.

The plate 24 of the tube 17 is connected through the winding 25 of the relay 23 to the terminal 26 of the inductance coil 12. The relay 23 is so constructed that, when current flows through the tube 17 and thus through the winding 25, it closes a circuit through the switch arm 27 and limiting resistance 29 thereby connecting the winding 25 to the line 13 through the thermal relay 22 which maintains the relay 23 in closed condition.

The operation of the circuit will be apparent from the above description and the following explanation. For simplicity of presentation, the portion of the circuit shown in heavy lines, starting from the line 14, passing through the heating element 11, thermal relay 22, switch arm 28 of the electro-magnetic relay 23 and from thence to the line 13, will be referred to hereinafter as the "heating circuit." The remainder of the circuit shown in light lines will be referred to hereinafter, for convenience, as the "control circuit."

Assuming the lines 13 and 14 are connected and the blanket 10 is in a relatively cold condition, the bridge circuit comprising the inductance coil 12, resistance 18 and heater element 11 is so arranged as to impress a grid voltage on the tube 17 which is less than the grid cut-off voltage for that tube, thereby causing current to flow through the tube 17 during the positive half-cycle of the supply voltage. This current energizes the winding 25 of the electromagnetic relay 23 sufficiently to close both switch arms 26 and 27. The closing of the switch arm 27, of course, directly connects the winding 25 across the line through thermal relay 22 thereby maintaining the relay 23 in closed condition so long as thermal relay 22 remains closed. The closing of the switch arm 26 completes the heating circuit and shortcircuits the resistance 18 thereby applying practically full line voltage across the heater element 11. This causes heat to be generated within the blanket 10 and this heating continues until the bi-metallic switch arm 30 of the thermal relay 22 becomes heated by the heater wire 21, thus causing the thermal relay 22 to open. When the thermal relay 22 is opened, the winding 25 of the electro-magnetic relay 23 is deenergized causing the switch arms 27 and 28 to move to open position. The circuit is then in the original or measuring condition of operation. If the blanket 10 is then in a warm condition, the bridge circuit is designed to provide a grid voltage on the tube 17 above cut-off or at least sufficient to reduce the flow of current through the tube 17 to below that at which the relay 23 will be actuated. However, if the blanket 10 is still in a cool condition or subsequently becomes cool through heat loss, the bridge will be in the original unbalanced condition and current will flow through the tube 17 which actuates the electro-magnetic relay 23 as soon as the thermal relay 22 cools down, thus repeating the operation described above.

As will be well understood, the values of temperature and/or temperature difference at which the regulation will take place may be established by control at any of several places in the circuit, as, for example, an adjustable element in the bridge circuit or in the vacuum tube circuit.

The control of the heat supplied to the blanket 10 operates on the basis of the changing resistance of the heater element 11. This resistance varies with the temperature of the element which is determined by the amount of energy supplied thereto and on the ambient temperatures, i. e., the temperature of the blanket surrounding the heater element 11. The resistance of the heater element 11 is, therefore, a direct index of the amount of energy withdrawn from it by its surroundings.

It thus will be seen that a simple circuit has been provided for utilizing the heater element of an electric blanket as a means of temperature control. There thus is avoided the need for supplemental resistor elements or bi-metallic elements either within the blanket or in the control box ordinarily required to make the control circuit responsive to blanket or ambient temperature.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A heat control arrangement for an electrically heated blanket comprising, in combination a blanket, an electrical heating element in said blanket whose resistance increases in relationship to increases in its temperature, means providing a connection between one end of said heating element and a source of electrical energy comprising in series a normally closed thermal relay having a heater wire for opening the relay after a predetermined closed period and a normally open electro-magnetic relay adapted when closed to lock in closed condition until the circuit is opened by said first named relay, a bridge circuit comprising said heating element connected at the other end of said heating element to the source of electrical energy and adapted to provide a voltage proportional to the change in resistance of said heating element, and amplifying means for energizing said electro-magnetic relay responsive to said voltage.

2. A heat control arrangement for an electrically heated blanket comprising, in combination, a blanket, an electrical heating element in said blanket the resistance of which increases in relationship to increases in its temperature, a bridge circuit comprising, in series, an inductance coil, a reference resistance having a negligible temperature coefficient of resistance and said heating element and adapted to be substantially balanced when the heating element is at a desired temperature, said heating element and reference resistance being connected in series to a source of electrical energy, a circuit for short circuiting the reference resistance thereby connecting the heating element across the source of electrical energy comprising a normally closed thermal relay adapted to be opened by the flow of current through the last named circuit after a predetermined period of operation and a normally open electro-magnetic relay adapted to lock in closed position while the last named circuit is closed, and amplifying means for energizing said electro-magnetic relay when said bridge circuit is unbalanced.

3. A heat control arrangement for an electrically heated blanket comprising, in combination, a blanket, an electrical heating element in said blanket whose resistance increases in relationship to increases in its temperature, a bridge circuit the arms of which comprise, in sequence, an inductance coil adapted to be connected to a source of electrical energy, a reference resistance having a negligible temperature coefficient of resistance and said heating element, said bridge circuit being connected at one end of the heating element to the source of electrical energy, a circuit for connecting the opposite end of said heating element directly to the source of electrical energy by short-circuiting the reference resistance including an electromagnetc self-locking relay, means for opening said last named circuit after a predetermined period of operation, and means for closing said relay responsive to the degree of balance and unbalance of said bridge circuit.

4. A heat control arrangement for an electrically heated blanket comprising, in combination, a blanket, an electrical heating element in said blanket the resistance of which increases in relationship to increases in its temperature, a bridge circuit comprising in series an inductance coil adapted to be connected to a source of electrical energy, a reference resistance having a negligible temperature coefficient of resistance, and said heating element, an amplifier tube controlled by said bridge circuit connected to said inductance coil and arranged to provide a flow of current when the resistance of the heating element falls below a predetermined minimum, and a self-opening circuit for short circuiting the reference resistance and thereby connecting the heating element directly to a source of electrical energy including a normally open electromagnetic self-locking relay adapted to be actuated by a predetermined flow of current through said amplifier tube.

5. A heat control arrangement for an electrically heated blanket comprising, in combination, a blanket, an electrical heating element in said blanket whose resistance increases in relationship to increases in its temperature, a bridge circuit comprising an inductance coil adapted to be connected to a source of electrical energy, a reference resistance having a negligible temperature coefficient of resistance and said heating element, a circuit for connecting the heating element to the source of electrical energy and short circuiting the reference resistance including a normally closed thermal relay adapted to open after a predetermined flow of current through the heating element, a normally open electro-magnetic relay for closing said circuit, means for retaining said relay in closed condition when said circuit is closed, a circuit for energizing said relay comprising an amplifier tube connected in series with said relay and inductance coil having a grid voltage determined by the unbalance of said bridge circuit whereby the electro-magnetic relay is energized when the temperature of the heating element falls below a predetermined minimum.

ARNOLD E. RUDAHL.

REFERENCES CITED

The following references are of record in the file of this patent:

UNITED STATES PATENTS

| Number | Name | Date |
|---|---|---|
| 915,974 | Leonard | Mar. 23, 1909 |
| 1,694,264 | Hull | Dec. 4, 1928 |
| 1,826,477 | Olpp | Oct. 6, 1931 |
| 1,979,082 | Schwedenberg et al. | Oct. 30, 1934 |
| 2,163,297 | Waage | June 20, 1939 |
| 2,429,453 | Crowley | Oct. 21, 1947 |

FOREIGN PATENTS

| Number | Country | Date |
|---|---|---|
| 144,669 | Great Britain | Sept. 9, 1921 |
| 338,880 | Great Britain | Nov. 18, 1930 |